United States Patent
Nada et al.

(10) Patent No.: US 9,153,234 B2
(45) Date of Patent: Oct. 6, 2015

(54) SPEECH RECOGNITION APPARATUS, METHOD OF RECOGNIZING SPEECH, AND COMPUTER READABLE MEDIUM FOR THE SAME

(71) Applicant: DENSO CORPORATION, Kariya, Aichi-pref. (JP)

(72) Inventors: Toru Nada, Inazawa (JP); Kiyotaka Taguchi, Kariya (JP); Makoto Manabe, Chiryu (JP); Shinji Hatanaka, Okazaki (JP); Norio Sanma, Okazaki (JP); Makoto Obayashi, Kashiwa (JP); Akira Yoshizawa, Koganei (JP)

(73) Assignee: DENSO CORPORATION, Kariya (JP)

( * ) Notice: Subject to any disclaimer, the term of this patent is extended or adjusted under 35 U.S.C. 154(b) by 262 days.

(21) Appl. No.: 13/847,001

(22) Filed: Mar. 19, 2013

(65) Prior Publication Data

US 2013/0275130 A1 Oct. 17, 2013

(30) Foreign Application Priority Data

Mar. 21, 2012 (JP) ................................. 2012-064054
Mar. 6, 2013 (JP) ................................. 2013-044442

(51) Int. Cl.
*G10L 15/00* (2013.01)
*G10L 15/26* (2006.01)
*G10L 15/22* (2006.01)

(52) U.S. Cl.
CPC ............. *G10L 15/265* (2013.01); *G10L 15/22* (2013.01); *G10L 15/26* (2013.01); *G10L 2015/221* (2013.01)

(58) Field of Classification Search
CPC ................................ G10L 15/26; G06F 17/24
USPC .......................................................... 704/235
See application file for complete search history.

(56) References Cited

U.S. PATENT DOCUMENTS

| 5,970,460 A * | 10/1999 | Bunce et al. .................. 704/278 |
| 6,212,497 B1 * | 4/2001 | Araki et al. .................... 704/235 |
| 6,986,106 B2 * | 1/2006 | Soin et al. ...................... 715/271 |
| 7,941,316 B2 * | 5/2011 | Mahajan et al. ............... 704/235 |
| 2009/0326938 A1 * | 12/2009 | Marila et al. ................... 704/235 |
| 2013/0213179 A1 | 8/2013 | Hatanaka et al. |

FOREIGN PATENT DOCUMENTS

| JP | 2000-259178 A | 9/2000 |
| JP | 2004-258480 A | 9/2004 |
| JP | 2005-096519 A | 4/2005 |
| JP | 2005-283797 A | 10/2005 |
| JP | 2009-046082 A | 3/2009 |
| JP | 2009-298285 A | 12/2009 |
| JP | 2010-018204 A | 1/2010 |
| JP | 2010-164918 A | 7/2010 |
| JP | 2011-128766 A | 6/2011 |

* cited by examiner

*Primary Examiner* — Daniel Abebe
(74) *Attorney, Agent, or Firm* — Posz Law Group, PLC

(57) ABSTRACT

A speech recognition apparatus includes: a recognition device that recognizes a speech of a user and generates a speech character string; a display device that displays the speech character string; a reception device that receives an input of a correction character string, which is used for correction of the speech character string, through an operation portion; and a correction device that corrects the speech character string with using the correction character string.

13 Claims, 13 Drawing Sheets

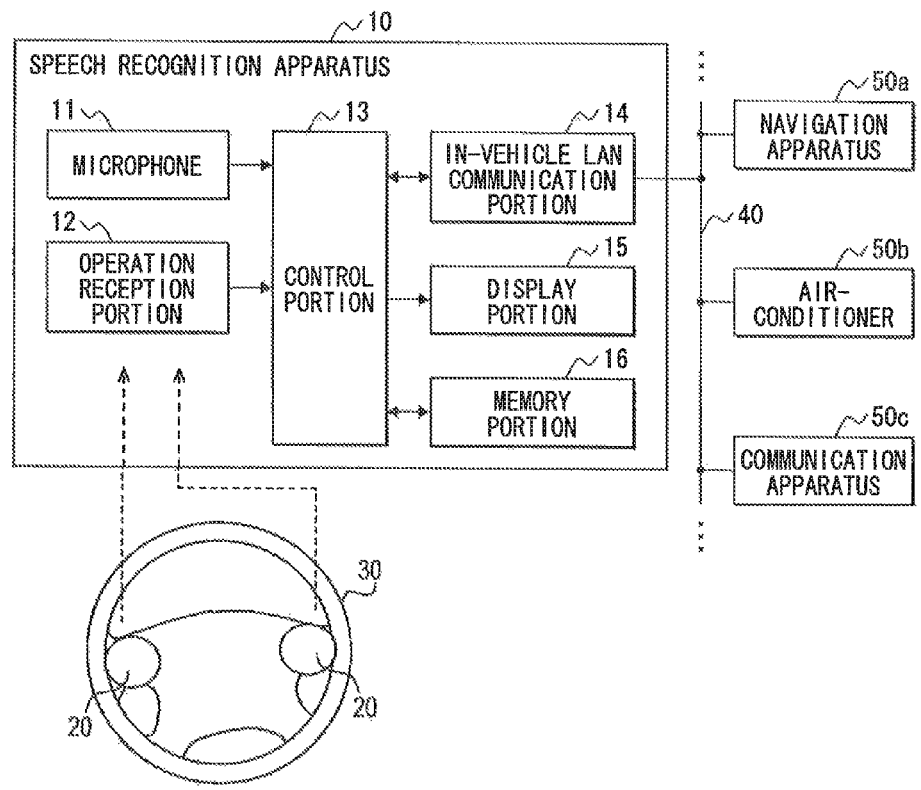
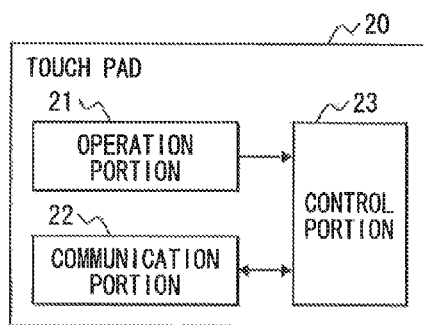

SPEECH RECOGNITION APPARATUS, METHOD OF RECOGNIZING SPEECH, AND COMPUTER READABLE MEDIUM FOR THE SAME

CROSS REFERENCE TO RELATED APPLICATIONS

This application is based on Japanese Patent Applications No. 2012-64054 filed on Mar. 21, 2012, and No. 2013-44442 filed on Mar. 6, 2013, the disclosures of which are incorporated herein by reference.

TECHNICAL FIELD

The present disclosure relates to a speech recognition apparatus for recognizing a voice made by a user, a method for recognizing speech, and a computer readable medium for recognizing speech.

BACKGROUND

Conventionally, a speech recognition technique for recognizing a content of a voice of a user is known. This speech recognition technique is applied to an in-vehicle apparatus, so that the apparatus executes various processes in accordance with a result of speech recognition. Thus, a driver, who drives a vehicle, can execute an operation of the in-vehicle apparatus with directing a view point forward and handling a steering wheel. However, it is difficult to always recognize the speech content accurately. Specifically, when the vehicle is in a noisy environment such as in a running state, it is difficult to obtain a speech recognition result appropriately.

Here, the patent document No. 1 teaches a speech recognition apparatus that displays the speech recognition result and correction instructions indicative of multiple patterns with respect to the speech recognition result, and, when the user makes a voice corresponding to one of the correction instructions, recognizes the one of the correction instructions, and further, corrects the original speech recognition result based on the one of the correction instructions, which is recognized in the voice. In this speech recognition apparatus, even when the speech content is misrecognized, the apparatus easily corrects the speech content.

However, when the making voices of the correction instructions resemble each other, the apparatus may misrecognize the voice again. Further, in general, when the speech content is misrecognized, the user can not understand which part of and how the pronunciation of the user is not appropriate. Thus, similar misrecognition may often occur repeatedly. Thus, in the speech recognition apparatus as described in the cited document No. 1, when the correction instruction of the speech recognition result is performed by the voice, the correction instruction made by the voice may be similarly misrecognized. The user may receive strong stress.

[Patent document No. 1] JP-A-2005-283797

SUMMARY

It is an object of the present disclosure to provide a speech recognition apparatus that easily and precisely corrects speech content, which is misrecognized, when the speech content is misrecognized, a method for recognizing speech, and a computer readable medium for recognizing speech.

According to an aspect of the present disclosure, a speech recognition apparatus includes: a recognition device for recognizing a voice made by a user and generating a speech character string as a character string indicative of a recognition result; a display device for displaying the speech character string generated by the recognition device; a reception device for receiving an input of a correction character string, which is displayed on the display device and used for correction of the speech character string, through an operation portion that is operated by the user under a condition that a part of a body contacts the operation portion; and a correction device for correcting the speech character string with the correction character string, which is input by the reception device.

In the above constitution, when the speech content recognized in the voice is wrong, an error is corrected by a manual operation such as a tapping operation or a swiping operation to the operation portion. Thus, the speech content, which is misrecognized, is easily and precisely corrected.

BRIEF DESCRIPTION OF THE DRAWINGS

The above and other objects, features and advantages of the present disclosure will become more apparent from the following detailed description made with reference to the accompanying drawings. In the drawings:

FIG. 1 is a block diagram showing a construction of a speech recognition apparatus according to a first embodiment;

FIG. 2 is a block diagram showing a construction of a touch pad according to the first embodiment;

DETAILED DESCRIPTION

First Embodiment (Explanation of Construction)

Figure 3:
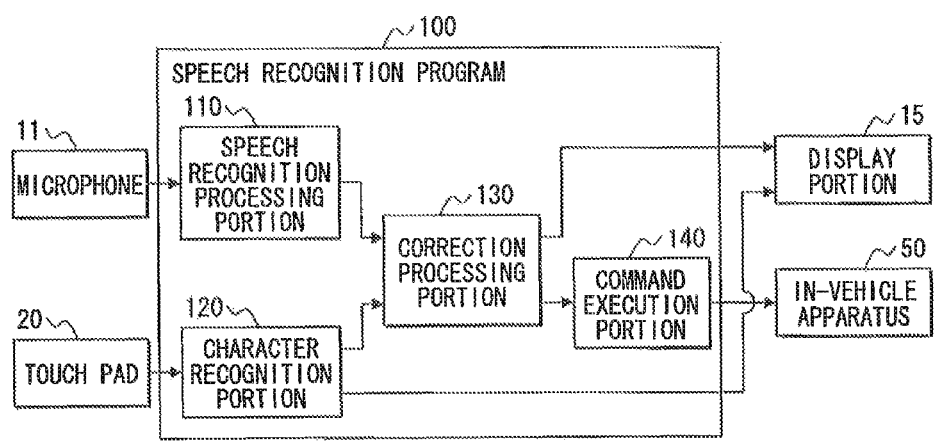
FIG. 3 is a block diagram showing a construction of a speech recognition program according to the first embodiment.

First, a construction of an in-vehicle speech recognition apparatus 10 according to a first embodiment will be explained with reference to FIG. 1.

The speech recognition apparatus 10 is attached to a steering wheel 30 of the vehicle. The apparatus 10 is connected to two touch pads 20, each of which is operable under a condition that a driver holds the steering wheel. Further, the apparatus 10 is connected to an in-vehicle device such as a navigation device 50a, an air conditioner 50b, and a conventional communication device 50c for accessing an Internet via a wireless communication through an in-vehicle LAN 40.

Here, the speech recognition apparatus 10 may be provided by the navigation device or the like. Further, the tough pad 20 arranged on a right side of the steering wheel 30 is defined as a right side touch pad 20, and the touch pad 20 arranged on the left side is defined as a left side touch pad 20, based on a condition as a standard that a steering angle is zero degree.

The speech recognition apparatus 10 includes: a microphone 11 for collecting a voice of a driver or the like and generating a voice signal; an operation reception portion 12 for communicating with each touch pad 20 and obtaining operation information; and a control portion 13 including a conventional CPU, a ROM, a RAM and the like, for example, and controlling totally the speech recognition apparatus 10. Further, the apparatus 10 includes an in-vehicle LAN communication portion 14 for communicating with an in-vehicle device via an in-vehicle LAN 40; a display portion 15 including a liquid crystal display or the like; and a memory portion 16 including a flash memory, a HDD or the like, for example.

Here, as shown in FIG. 2, the touch pad 20 includes: an operation portion 21 for receiving a touch operation via a planar operation surface; a communication portion 22 for communicating with the speech recognition apparatus 10; a control portion 23 including a conventional CPU, a ROM, a RAM and the like, for example, and controlling totally the touch pad 20.

The control portion 23 generates operation information, at periodic timing, indicative of presence or absence of the touch operation performed to the operation portion 21 and indicative of a position (as a touch position), at which the touch operation is performed.

On the other hand, when the control portion 13 of the speech recognition apparatus 10 obtains the operation information from the ouch pad 20, the control portion 13 performs various processes in accordance with the operation information. Further, the control portion 13 transmits the operation information to other in-vehicle devices if necessary. Accordingly, the driver can operate the speech recognition apparatus 10 and other in-vehicle devices via the touch pad 20.

The speech recognition apparatus 10 has a speech recognition function for recognizing a content of a voice made by the driver or the like via the microphone 11. Thus, the apparatus 10 generates a command in accordance with the speech recognition result, and transmits the command to other in-vehicle devices via the in-vehicle LAN 40. Therefore, the driver or the like can operate the speech recognition apparatus 10 and the in-vehicle device such as the navigation device 50a with the voice.

Further, in addition, the speech recognition apparatus 10 generates a document based on the speech recognition result, and transmits the document as a mail to an external device via the communication device 50c. Further, the apparatus 10 accesses the Internet and submits the document to the Twitter or the like.

Further, the speech recognition apparatus 10 has a function for correcting the speech recognition result according to the operation received via the touch pad 20.

Thus, the speech recognition program 100 stored in the speech recognition apparatus 10 (i.e., stored in the ROM of the control portion 13) provides a speech recognition processing portion 110 for executing speech recognition process with a conventional method based on the voice signal generated by the microphone 11 and generating a character string (as a speech character string) indicative of the speech recognition result (please refer to FIG. 3).

Further, the program 100 provides a character recognition portion 120 for recognizing a character drawn on an operation surface of the touch pad 20 according to a trajectory of the touch position, which is shown by the operation information obtained from the touch pad 20, and for displaying the recognized character on the display portion 15.

Further, the program 100 provides a correction processing portion 130 for correcting the speech character string based on a character string including a character recognized by the character recognition portion 120 and the operation received from the touch pad 20, and for displaying the speech character string (i.e., the corrected character string) after correction on the display portion 15.

Further, the program 100 provides a command processing portion 140 for performing various processes in accordance with the corrected character string, which is already corrected by the correction processing portion 130. The command processing portion 140 generates the command corresponding to the corrected character string, and transmits the command to the other in-vehicle device 50 via the in-vehicle LAN 40. Further, the portion 140 transmits the corrected character string as a document to the communication device 50c so that the device 50c transmits the mail or the like.

(Explanation of Operation)

Next, the operation of the speech recognition apparatus 10 according to the first embodiment will be explained. In the first embodiment, the speech recognition apparatus 10 detects the character string (i.e., the misrecognized character string), which is misrecognized, in the speech character string as the recognition result of the speech content of the driver or the like, according to the correction character string including the character input via the touch pad 20. The apparatus 10 generates the corrected character string by replacing the misrecognized character string in the speech character string with the correction character string. Further, the apparatus 10 performs various processes based on the corrected character string.

Figure 4:
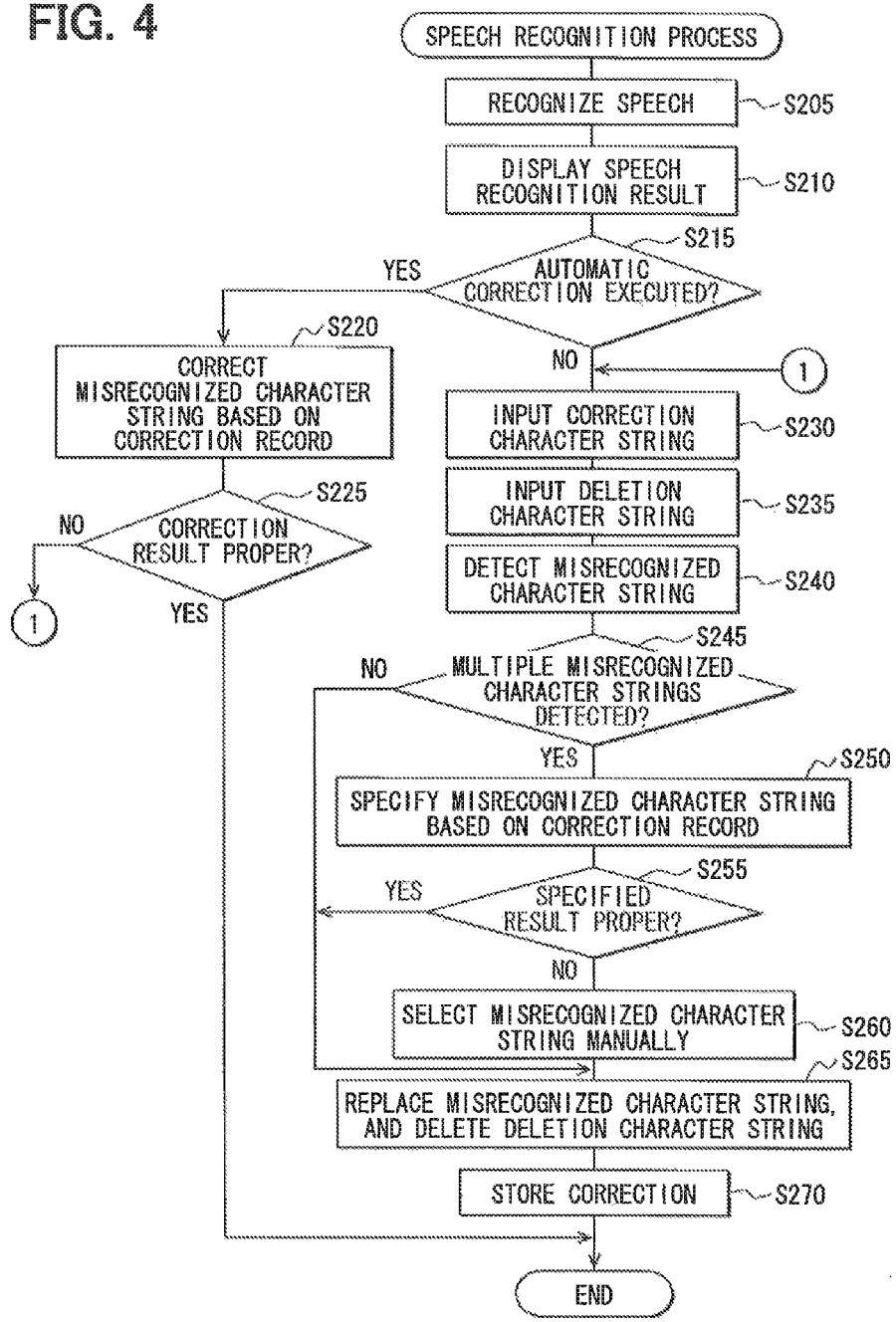
FIG. 4 is a flowchart showing a speech recognition process according to the first embodiment.

The speech recognition process for recognizing a speech in the voice made by the driver or the like and for correcting the speech character string as the speech recognition result with using the correction character string will be explained with reference to the flowchart in FIG. 4. Here, the speech recognition process is performed by the speech recognition apparatus 10, which functions according to the speech recognition program 100, and the speech recognition process is a process executed when the driver or the like starts to make a voice.

At step S205, the control portion 13 of the speech recognition apparatus 10 performs the speech recognition of the speech content by a conventional method, and generates the character string of Japanese hiragana character indicative of the speech recognition result. Thus, the character string is converted to a Chinese character or a Japanese katakana character by a conventional method. The character string after conversion is defined as a speech character string, and then, it goes to step S210.

At step S210, the control portion 13 displays the speech character string as the speech recognition result on the display portion 15. Then, it goes to step S215.

At step S215, the control portion 13 determines whether the speech character string is corrected (i.e., automatically corrected) based on the correction record data, which is a record of correction of the speech character string performed in the past.

Specifically, for example, the control portion 13 may access the memory portion 16 to refer to the set data relating to the speech recognition so that the portion 13 determines whether the automatic correction is set. Alternatively, the control portion 13 may inquire of the driver or the like through the display portion 15 whether the automatic correction is executed. Further, the portion 13 receives the response with respect to the inquiry through the touch pad 20, so that the portion 13 determines based on the response whether the automatic correction is executed. When the positive determination is obtained (i.e., "Yes" in step S215), it goes to step S220. When the negative determination is obtained (i.e., "No" in step S215), it goes to step S230.

At step S220, the control portion 13 corrects the speech character string based on the correction record data, which is stored in the memory portion 16. The correction record data stores the misrecognized character string, which is included in the speech character string generated in the past, and the correction character string, in which the misrecognized character string is replaced, the misrecognized character string and the correction character string being connected to each other. The control portion 13 determines whether the misrecognized character string stored in the correction record data is included in the speech character string, which is newly generated.

When the misrecognized character string is included in the speech character string, the misrecognized character string in the speech character string is replaced with the correction character string, which is connected to the misrecognized character string in the correction record data. Further, the speech character string after replacement is displayed as the corrected character string on the display portion 15. Then, the process proceeds to step S225.

At step S225, the control portion 13 inquires of the driver or the like through the display portion 15 whether the correction result executed by the automatic correction is proper. Further, the portion 13 receives the response with respect to the inquiry through the touch pad 20. When the portion 13 receives the response that the correction result is proper (i.e., "Yes" in step S225), the present process is completed. When the portion 13 receives the response that the correction result is improper (i.e., "No" in step S225), the process proceeds to step S230.

At step S230, the control portion 13 receives the input of the correction character string through one of the touch pads 20 (e.g., the right side touch pad). Specifically, the portion 13 receives the operation for inputting the character one by one on the operation surface of the touch pad 20. Further, while the operation is being executed, the portion 13 detects each input letter based on the trajectory of the touch position, which is shown in the operation information received from the touch pad 20. These letters are aligned in a detected order so as to form the character string. Further, the character string is converted to a Chinese character, a Japanese katakana character, and/or a Japanese hiragana character by a conventional method so as to form the correction character string. Then, the process proceeds to step S235.

At step S235, the control portion 13 receives the input of the deletion character string, which is a character string to be deleted from the speech character string, through the other touch pad 20 (e.g., the left side touch pad). Specifically, similar to a case where the portion 13 receives the input of the correction character string, the portion 13 receives the operation for inputting a character one by one on the operation surface of the touch pad 20. Further, the portion 13 detects each input letter based on the trajectory of the touch position, which is shown in the operation information received from the touch pad 20. These letters are aligned in a detected order so as to form the character string. Further, the character string is converted to a Chinese character, a Japanese katakana character, and/or a Japanese hiragana character by a conventional method so as to form the deletion character string. Then, the process proceeds to step S240.

At step S240, the control portion 13 detects the misrecognized character string in the speech character string based on the correction character string.

Figure 5:
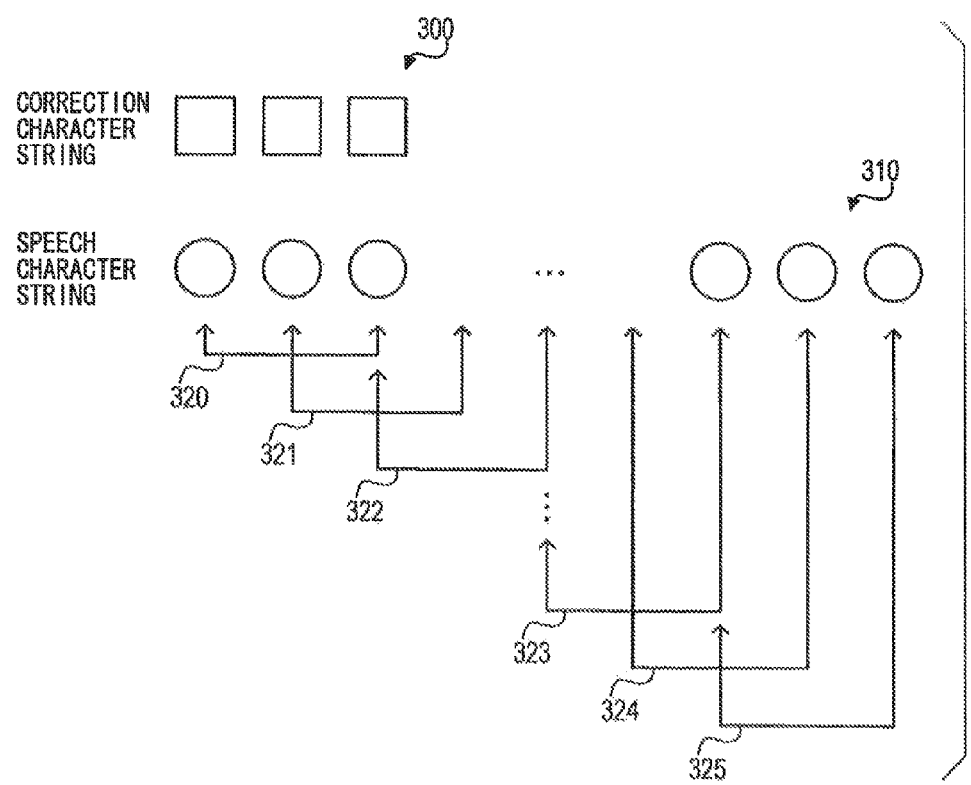
FIG. 5 is an explanatory diagram showing a process for detecting a misrecognized character string in a speech character string based on a correction character string.

Specifically, for example, as shown in FIG. 5, a character string having the number of letters equal to the correction character string 300 is referred as an object character string. Further, firstly, the object character string 320 having a head letter disposed at a beginning of the speech character string 310 is retrieved. Then, the head letter is displaced one by one toward an ending of the speech character string 310, so that the object character strings 321 to 324 are retrieved from the speech character string 310 sequentially. When the object character string 325 having a tail end letter disposed at an ending of the speech character string 310 is retrieved, the portion 13 determines that all of the object character strings are retrieved from the speech character string 310. Thus, the portion 13 ends to retrieve the object character strings.

Here, alternatively, the portion 13 may retrieve the object character string having the tail end letter disposed at the ending of the speech character string. Then, the tail end letter is displaced one by one toward the beginning of the speech character string, so that the object character strings are retrieved from the speech character string sequentially. When the object character string having the head letter disposed at the beginning of the speech character string is retrieved, the portion 13 determines that all of the object character strings are retrieved from the speech character string. Thus, the portion 13 ends to retrieve the object character strings.

Alternatively, in addition to the character string having the number of letters equal to the correction character string, for example, the character string having the number of letters, which is different by one or two letters from the correction character string, may be referred as the object character string, and a similar retrieving process may be performed.

In addition, each word class for providing the correction character string may be retrieved by a conventional method, and these word classes may be retrieved as the object character strings.

The control portion 13 compares each retrieved object character string with the correction character string so that the portion 13 detects one of the object character strings having the maximum number of letters, which coincide with the correction character string, as the misrecognition character string. Then, the process proceeds to step S245. Here, one of the object character strings having a ratio of letters, which coincide with the correction character string, the ratio being equal to or larger than a predetermined value, may be detected as the misrecognition character string.

At step S245, the control portion 13 determines whether multiple misrecognition character strings are detected. When the positive determination is obtained (i.e., "Yes" in step S245), the process proceeds to step S250. When the negative determination is obtained (i.e., "No" in step S245), the process proceeds to step S265.

At step S250, the control portion 13 specifies one of detected multiple misrecognition character strings as the misrecognition character string, which is not detected in the wrong, the one coinciding with the misrecognition character string stored in the correction record data. Then, the portion displays the one on the display portion 15. Further, the portion 13 cancels other misrecognition character strings. Then, the process proceeds to step S255.

At step S255, the control portion 13 inquires of the driver or the like through the display portion 15 whether the specified result of the misrecognition character string is proper. Further, the portion 13 receives the response with respect to the inquiry through the touch pad 20. When the portion 13 receives the response that the specified result is proper (i.e., "Yes" in step S255), the process proceeds to step S265. When the portion 13 receives the response that the specified result is improper (i.e., "No" in step S255), the process proceeds to step S260.

At step S260, the control portion 13 receives the operation for designating the misrecognition character string through the touch pad 20. In this case, the control portion 13 may display multiple misrecognition character strings detected at step S240 on the display portion 15, so that the portion 13 receives the operation for specifying one of the misrecognition character strings. When multiple misrecognition character strings are specified according to the correction record data, these misrecognition character strings may be displayed on the display portion 15, so that the portion 13 receives the operation for specifying one of the misrecognition character strings.

At step S265, the control portion 13 replaces the misrecognition character string included in the speech character string with the correction character string, which is used for detecting the misrecognition character string. Further, when the deletion character string is input, the portion 13 deletes the deletion character string included in the speech character string, which is already replaced, so that the corrected character string is generated. Then, the corrected character string is displayed on the display portion 15, and then, the process proceeds to step S270.

At step S270, the control portion 13 newly stores the correction character string and the misrecognition character string, in which the correction character string is replaced, as the correction record data, the correction character string and the misrecognition character string being connected to each other. Then, the present process ends.

Here, when the speech recognition process is completed, the control portion 13 determines whether the corrected character string coincides with a character string, which is registered as a phrase for executing the operation to the speech recognition apparatus 10 and other in-vehicle devices 50. When the corrected character string coincides with the character string, the portion 13 executes various processes based on the corrected character string. Further, when a mail is to be sent via the communication device 50c, the portion 13 makes the corrected character string in a written document. Then, the portion 13 transmits the document to the communication device 50c via the in-vehicle LAN 40.

Second Embodiment (Explanation of Construction)

Next, a speech recognition apparatus 10 for a vehicle according to a second embodiment will be explained.

The speech recognition apparatus 10 according to the second embodiment has a construction similar to the first embodiment. The apparatus 10 is connected to the in-vehicle LAN 40, which is connected to the navigation device 50a or the like. Further, the apparatus 10 is connected to two touch pads 20, which are attached to the steering wheel 30, similar to the first embodiment.

The touch pad 20 according to the second embodiment includes the operation portion 21, the communication portion 22 and the control portion 23, similar to the first embodiment. The operation portion 21 includes a strain detection element (not shown) for detecting a load applied to the operation surface.

The control portion 23 detects the touch position and the magnitude of force (i.e., operation force) applied at the touch position by a conventional method according to the signal from the strain detection element. The portion 23 generates the operation information indicative of existence and non-existence of the tough operation, the touch position and the operation force. The portion 23 transmits the operation information to the speech recognition apparatus 10 via the communication portion 22.

(Explanation of Operation)

Next, an operation of the speech recognition apparatus 10 according to the second embodiment will be explained. In the second embodiment, the speech recognition apparatus 10 receives the input of the correction character string via the touch pad 20. Further, the apparatus 10 receives the operation for specifying a character string included in the speech character string as a correction range. The apparatus 10 executes correction of the speech character string by replacing the character string in the correction range with the correction character string. Based on the speech character string after correction (i.e., the corrected character string), the apparatus 10 executes similar process as the first embodiment.

Figure 6:
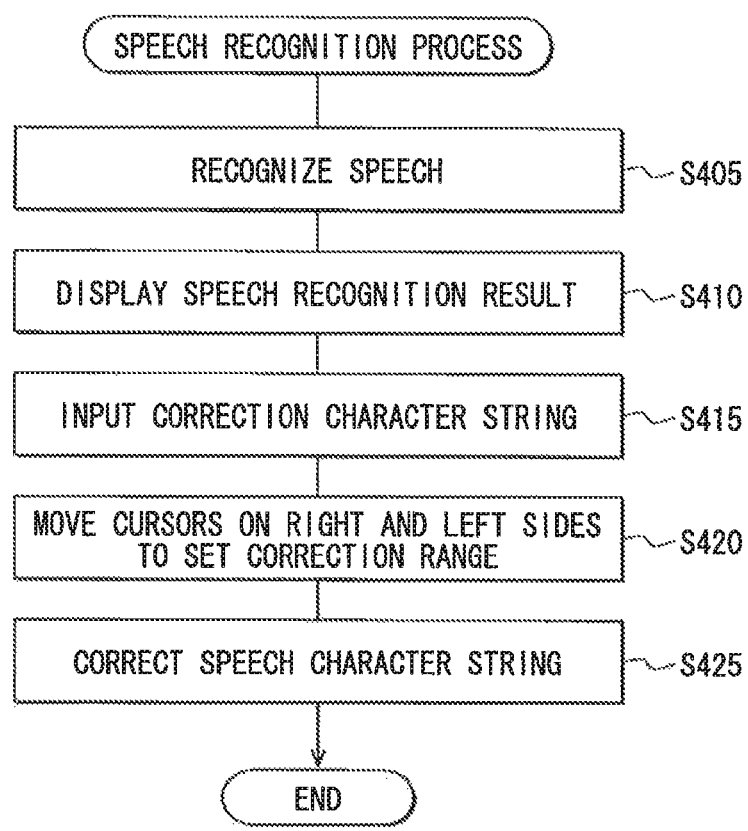
FIG. 6 is a flowchart showing a speech recognition process according to a second embodiment.

The speech recognition process for executing the speech recognition of the voice made by the driver or the like and for correcting the speech character string as the speech recognition result with using the correction character string will be explained with reference to the flowchart shown in FIG. 6 as follows. Here, the present process is performed by the speech recognition apparatus 10, which functions according to the speech recognition program 100, and the speech recognition process is a process executed when the driver or the like starts to make a voice.

At step S405, the control portion 13 of the speech recognition apparatus 10 performs the speech recognition of the speech content by a conventional method, and generates the character string of Japanese hiragana character indicative of the speech recognition result. Thus, the character string is converted to a Chinese character or a Japanese katakana character by a conventional method. The character string after conversion is defined as a speech character string, and then, the process proceeds to step S410. At step S410, the control portion 13 displays the speech character string as the speech recognition result on the display portion 15. Then, the process proceeds to step S415.

At step S415, similar to the first embodiment, the control portion 13 receives the input of the correction character string via the touch pad 20, and then, the process proceeds to step S420.

At step S420, the control portion 13 receives the operation for specifying the correction range of the speech character string via the right and left touch pads 20.

Figure 7:
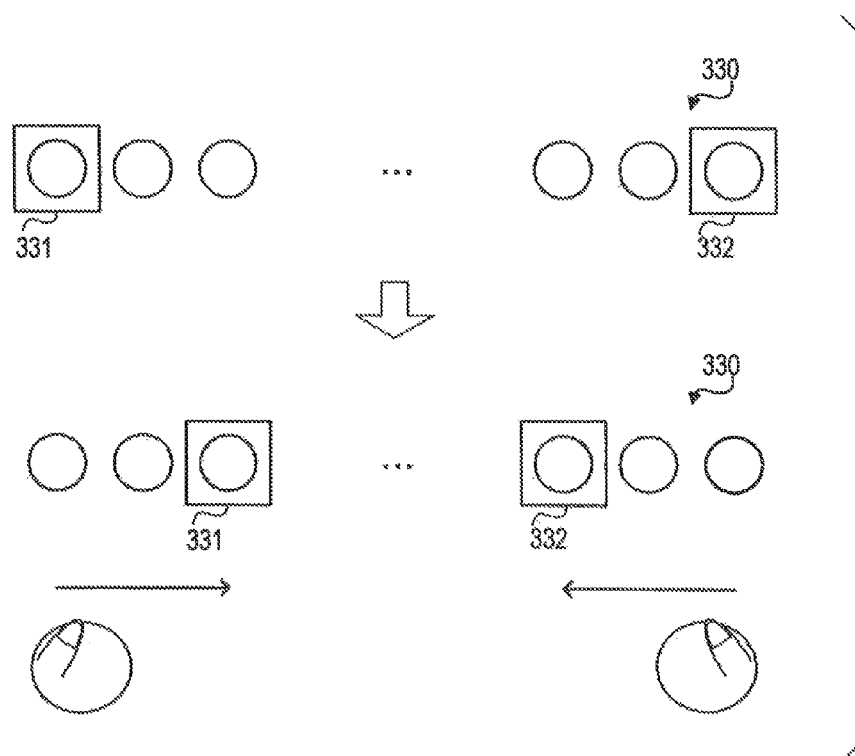
FIG. 7 is an explanatory diagram showing a screen image displayed when a correction range of the correction character string is set according to the second embodiment.

Specifically, for example, as shown in FIG. 7, the control portion 13 displays the left side cursor 331 and the right side cursor 332 under a condition that the cursors are overlapped on letters disposed at both ends of the speech character string 330, respectively, which is displayed on the display portion 15.

Here, the left side cursor 331 is displayed on the left side with respect to the screen of the display portion 15, and the right side cursor 332 is displayed on the right side. These cursors are displayed always under a condition that the cursors are overlapped on letters. Further, the left side cursor 331 corresponds to the left side touch pad 20, and the right side cursor 332 corresponds to the right side touch pad 20.

The control portion 13 moves the position of the left side cursor 331 in accordance with the magnitude of the operation force applied to the left side touch pad 20. Specifically, when the operation force is not applied to the touch pad 20, the portion 13 displays the left side cursor 331 on the left end of the speech character string 330. As the magnitude of the operation force increases, the portion 13 displays the left side cursor 331 to the right side. Similarly, the portion 13 moves the position of the right side cursor 332 to the left side in accordance with the magnitude of the operation force applied to the right side touch pad 20.

Besides this, the control portion 13 may move the position of the corresponding cursor in accordance with the operation for swiping the operation surface of the touch pad 20 (i.e., scraping operation), for example. Specifically, when the control portion 13 receives the scraping operation to the right direction, the portion 13 moves the corresponding cursor toward right. When the control portion 13 receives the scraping operation to the left direction, the portion 13 moves the corresponding cursor toward left.

After that, when the control portion 13 receives a specific operation via the touch pad 20, the portion 13 determines that the character string having both ends at the right and left cursors 331, 332 defines the correction range. Then, the process proceeds to step S425. Here, the portion 13 can display the right and left cursors 331, 332 to overlap on the same letter. In this case, the letter provides the correction range.

Further, for example, when the control portion 13 receives the specific operation via the touch pad 20, the portion 13 may receive the operation for specifying the insertion position, at which the correction character string is inserted, instead of the operation for specifying the correction range. In this case, for example, the portion 13 may display a cursor having a bar shape indicative of the insertion position, which is adjacent to one of letters in the speech character string. Further, the portion 13 may move the display position of the cursor in accordance with the scraping operation received through the touch pad 20.

At step S425, the control portion 13 corrects the speech character string by replacing the character string corresponding to the correction range with the input correction character string, so that the portion 13 generates the corrected character string. Further, when the portion 13 receives the designation of the insertion position of the correction character string, the portion 13 may generate the corrected character string by inserting the correction character string at the insertion position. Then, the portion 13 displays the corrected character string on the display portion 15. Then, the present process ends.

Third Embodiment (Explanation of Construction)

Next, a speech recognition apparatus 10 for a vehicle according to a third embodiment will be explained.

The speech recognition apparatus 10 according to the third embodiment has a construction similar to the first and second embodiments. The apparatus 10 is connected to the in-vehicle LAN 40, which is connected to the navigation device 50a or the like. Further, the apparatus 10 is connected to two touch pads 20, which are attached to the steering wheel 30, similar to the first and second embodiments.

The touch pad 20 according to the third embodiment includes the operation portion 21, the communication portion 22 and the control portion 23, similar to the first and second embodiments. The operation portion 21 includes an electrostatic capacitive touch panel, in which electrode rows having a lattice structure are arranged along the operation surface.

Accordingly, the control portion 23 can detect the operation that an user touches two places on the operation surface of the operation portion 21 at the same time. Thus, the portion 23 generates the operation information, at periodic timing, indicative of existence and non-existence of the touch operation and the touch positions of two places at a maximum. Then, the portion 23 transmits the operation information to the speech recognition apparatus 10 via the communication portion 22.

(Explanation of Operation)

Next, an operation of the speech recognition apparatus 10 according to the third embodiment will be explained. In the third embodiment, the speech recognition apparatus 10 receives the operation for editing the speech character string with using the touch pad 20. Further, the apparatus 10 receives the input of the correction character string, and receives the operation for specifying the insertion position of the correction character string and the correction range in the speech character string. Based on these, the apparatus 10 edits the speech character string. Further, based on the speech character string, which is already edited (i.e., edited speech character string), the apparatus 10 executes similar process as the first and second embodiments.

Figure 8:
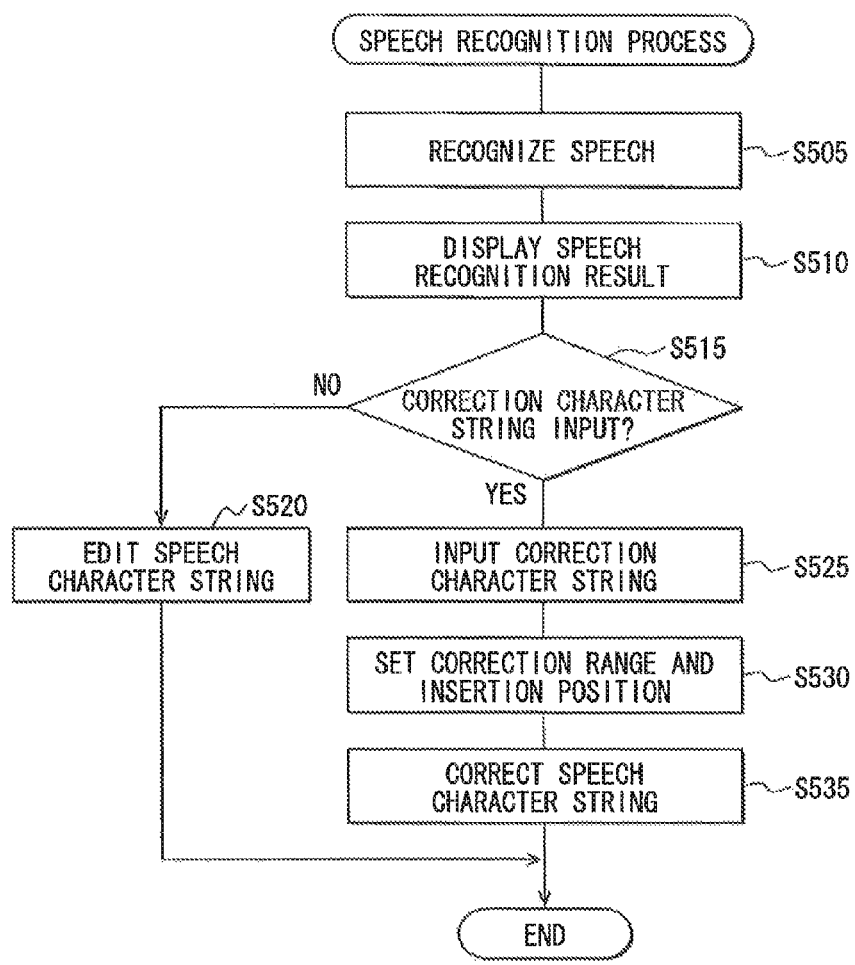
FIG. 8 is a flowchart showing a speech recognition process according to a third embodiment.

The speech recognition process for recognizing a speech in the voice made by the driver or the like and for correcting the speech character string as the speech recognition result will be explained with reference to the flowchart in FIG. 8. Here, the speech recognition process is performed by the speech recognition apparatus 10, which functions according to the speech recognition program 100, and the speech recognition process is a process executed when the driver or the like starts to make a voice.

At step S505, the control portion 13 of the speech recognition apparatus 10 performs the speech recognition of the speech content by a conventional method, and generates the character string of Japanese hiragana character indicative of the speech recognition result. Thus, the character string is converted to a Chinese character or a Japanese katakana character by a conventional method. The character string after conversion is defined as a speech character string, and then, the process proceeds to step S510.

At step S510, the control portion 13 displays the speech character string as the speech recognition result on the display portion 15. Then, the process proceeds to step S515.

At step S515, the control portion 13 receives an instruction of the correction character string via one of the touch pads 20. When the control portion 13 receives the instruction (i.e., "Yes" in step S515), the process proceeds to step S525. When the control portion 13 does not receive the instruction (i.e., "No" in step S515), the process proceeds to step S520.

At step S520, the control portion 13 edits the speech character string in accordance with the operation received through the touch pad 20, so that the speech character string after edit is referred as the edited character string.

Figure 9:
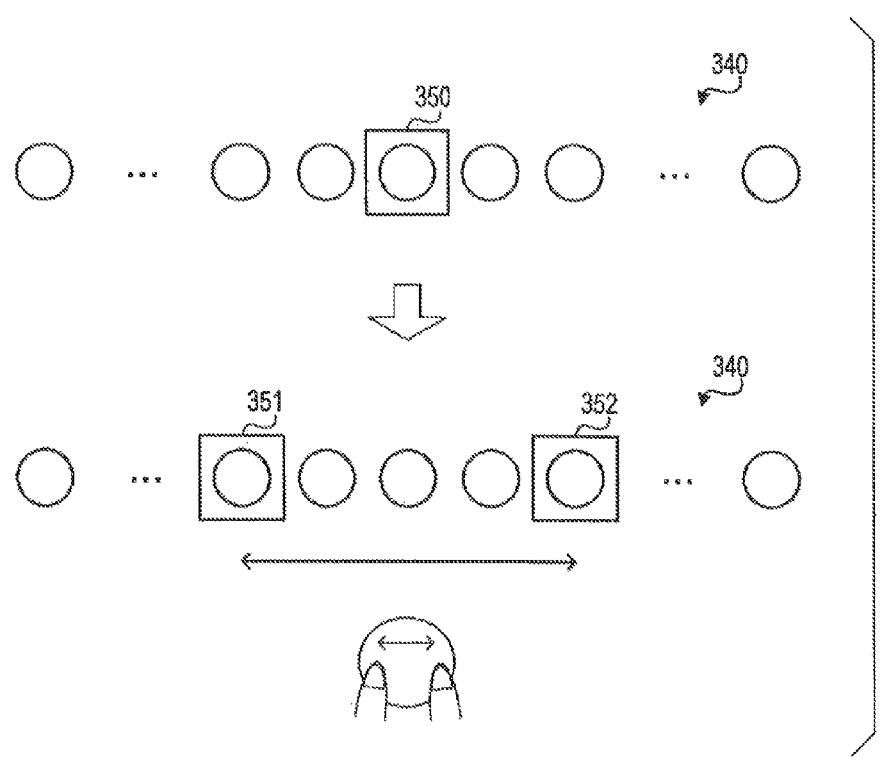
FIG. 9 is an explanatory diagram showing a screen image displayed when a correction range of the correction character string is set according to the third embodiment.

Specifically, as shown in FIG. 9, for example, the control portion 13 displays one of the cursors 350 under a condition that the cursor 350 overlaps on the letter disposed at the center of the speech character string. Further, the portion 13 moves the position of the cursor 350 to another position, at which the cursor 350 overlaps on one of letters, in accordance with the operation received through the touch pad 20.

When the portion 13 receives the operation that the user touches two places on the operation surface of the operation portion 21 at the same time, the portion 13 displays the right side cursor 352 and the left side cursor 351 at positions, at which the cursors overlap two adjacent letters. Here, the right and left side cursors 351, 352 are displayed always under a condition that the cursors overlap on one of letters in the speech character string.

After that, when the portion 13 receives the operation (i.e., a pinching operation) for scraping the touch positions in a lateral direction so as to distance two touch positions from each other or to approximate two touch positions, the portion 13 moves the positions of the right and left side cursors 351, 352 in accordance with the distance between touch positions. Specifically, as the distance between touch positions increases, the cursors are displaced so as to expand the distance between the cursors. Further, as the distance between touch positions decreases, the cursors are displaced so as to reduce the distance between the cursors.

Here, in addition to the pinching operation, for example, the control portion 13 may move the right and left side cursors 351, 352 in accordance with the scraping operation to the right and left side touch pads 20, similar to the second embodiment.

Further, the control portion 13 receives the operation, via the touch pad 20, for deleting the character string in the correction range having both ends of the right and left side cursors 351, 352. Here, the right and left side cursors 351, 352 can be displayed to overlap on the same letter by the pinching operation or the like. In this case, the letter provides the correction range.

In addition to the above, for example, the portion 13 receives the operation for inserting at a specific insertion position in the speech character string by copying and pasting the correction range. Further, the portion 13 edits the speech character string in accordance with these operations, so that the speech character string after the edit is defined as the corrected character string. Then, the present process ends.

On the other hand, at step S525, the control portion 13 receives the input of the correction character string through one of the touch pads 20 (e.g., the right side touch pad), similar to the first embodiment. Then, the process proceeds to step S530.

At step S530, the control portion 13 receives the instruction for editing the speech character string with using the correction character string through the other touch pad 20 (e.g., the left side touch pad). Specifically, for example, similar to step S520, the portion 13 may receive the designation of the correction range by the pinching operation to the touch pad 20. Further, the portion 13 may receive the instruction for replacing the character string in the correction range with the correction character string. In addition, for example, the portion 13 may receive the designation of the insertion position of the correction character string or the like by the scraping operation to the touch pad 20. Further, the portion 13 may receive the instruction for inserting the correction character string at the insertion position.

Then, at step S535, the control portion 13 edits the speech character string with using the correction character string in accordance with the instruction received at step S530, so that the portion 13 generates the corrected character string. Then, the portion 13 displays the corrected character string on the display portion 15. Then, the present process ends.

Fourth Embodiment (Explanation of Construction)

Next, a speech recognition apparatus 10 for a vehicle according to a fourth embodiment will be explained.

The speech recognition apparatus 10 according to the fourth embodiment has a construction similar to the first embodiment. The apparatus 10 is connected to the in-vehicle LAN 40, which is connected to the navigation device 50a or the like. Further, the apparatus 10 is connected to two touch pads 20, which are attached to the steering wheel 30, similar to the first embodiment.

These touch pads 20 has a construction similar to the second embodiment. The touch pads 20 transmits the operation information, at periodic timing, indicative of existence and non-existence of the touch operation the touch positions and the operation force to the speech recognition apparatus 10.

Further, the speech recognition apparatus 10 stores the speech recognition program 100, which has a similar constitution to the first embodiment.

(Explanation of Operation)

Next, an operation of the speech recognition apparatus 10 according to the fourth embodiment will be explained. In the fourth embodiment, the speech recognition apparatus 10 detects the misrecognition character string in the speech character string with using the correction character string input through the touch pad 20, similar to the first embodiment. Further, the apparatus 10 generates the corrected character string by replacing the misrecognition character string with the correction character string. Based on the corrected character string, the apparatus 10 executes various processes.

The apparatus 10 detects the misrecognition character string in a whole range of the speech character string as an object in the first embodiment. However, in the fourth embodiment, the correction range as the object for detecting the misrecognition character string in the speech character string is changeable. This feature is different from the first embodiment.

Figure 10:
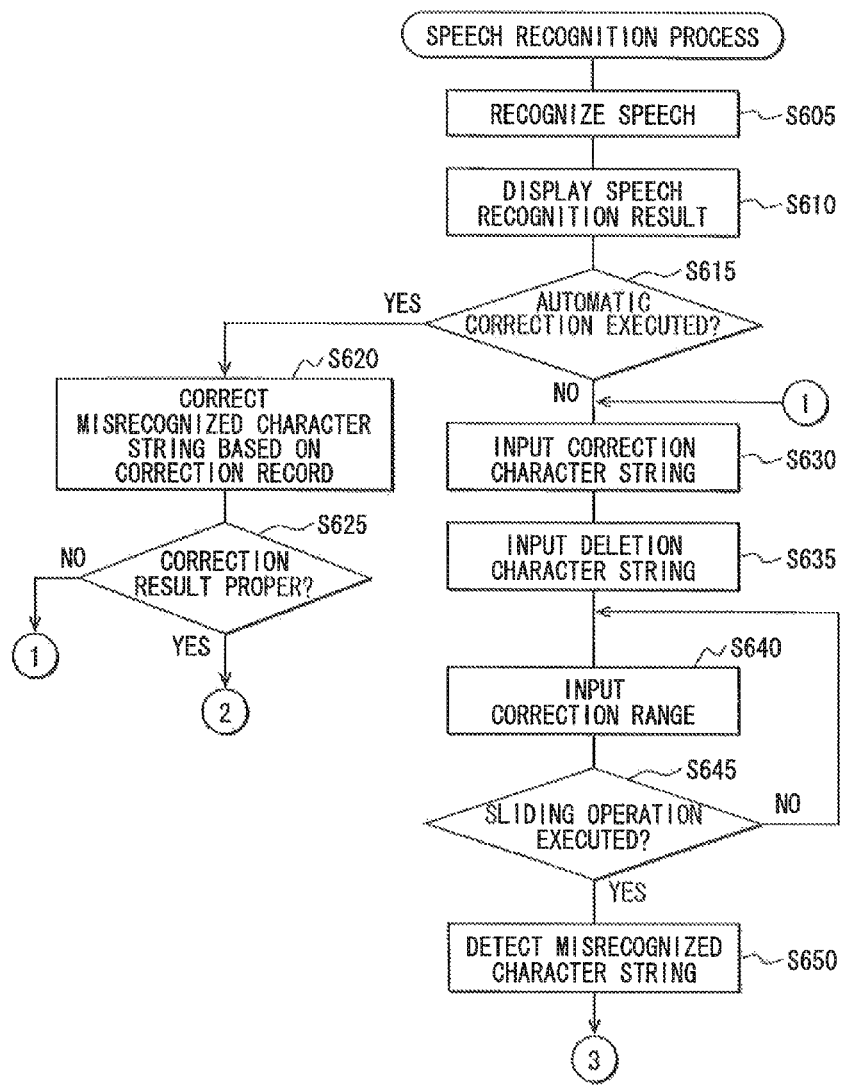
FIG. 10 is a flowchart showing a speech recognition process according to a fourth embodiment.
Figure 11:
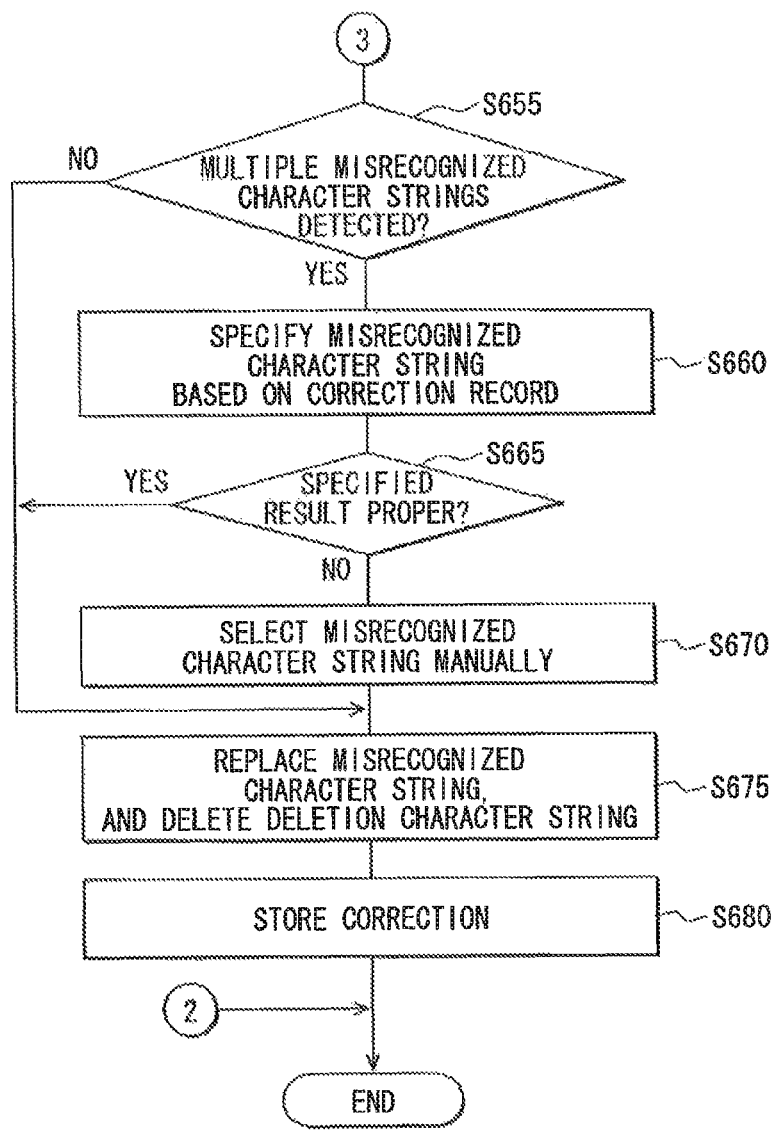
FIG. 11 is a flowchart showing a speech recognition process according to the fourth embodiment.

The speech recognition process for recognizing a speech in the voice made by the driver or the like so as to generate the speech character string and for correcting the speech character string with using the correction character string will be explained with reference to the flowchart in FIGS. 10 and 11. Here, the speech recognition process is performed by the speech recognition apparatus 10, which functions according to the speech recognition program 100, and the speech recognition process is a process executed when the driver or the like starts to make a voice.

The process in steps S605 to S635 are similar to steps S205 to S235 in the speech recognition process according to the first embodiment. Thus, the explanation of the process is skipped.

Figure 12:
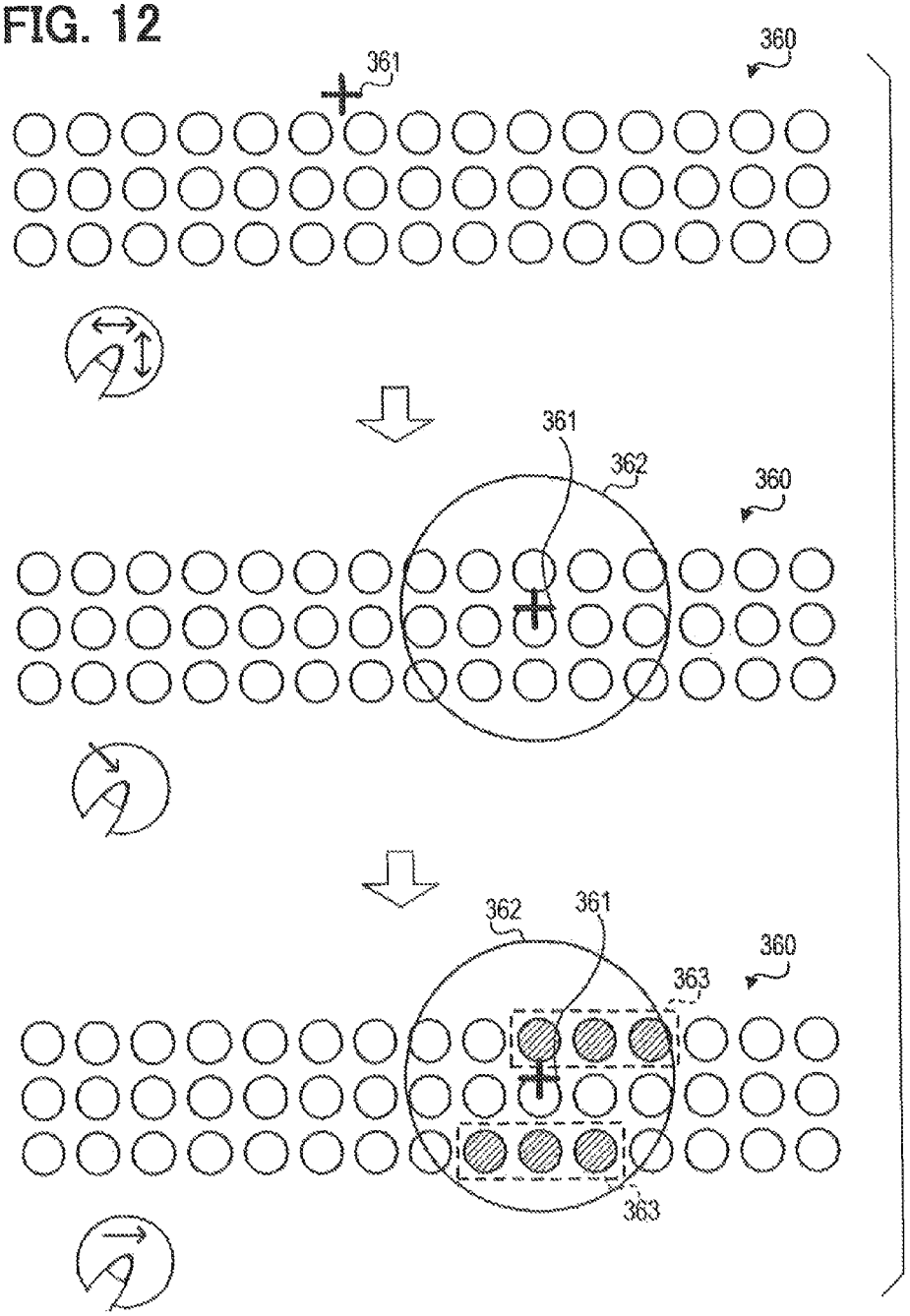
FIG. 12 is an explanatory diagram showing a screen image displayed when a correction range of the speech character string is set according to the fourth embodiment.

At step S640, the control portion 13 of the speech recognition apparatus 10 receives the setting of the correction range through one of the touch pads 20. Specifically, the control portion 13 displays the cursor 361 in a display region 360 of the speech character string, which is displayed on the display portion 15. Further, the portion 13 moves the position of the cursor 361 in accordance with the operation of swiping the operation surface of the touch pad 20 (please refer to FIG. 12).

Further, in this case, when a certain operation force is applied to the operation surface, the control portion 13 displays, in the display region 360 of the speech character string, the correction region 362 having a circular shape with a center of a display position of the cursor 361 (as a standard position). The portion 13 controls the areas of the correction region 362 in accordance with the operation force. Here, as the operation force increases, the area of the correction region 362 increases.

Figure 13:
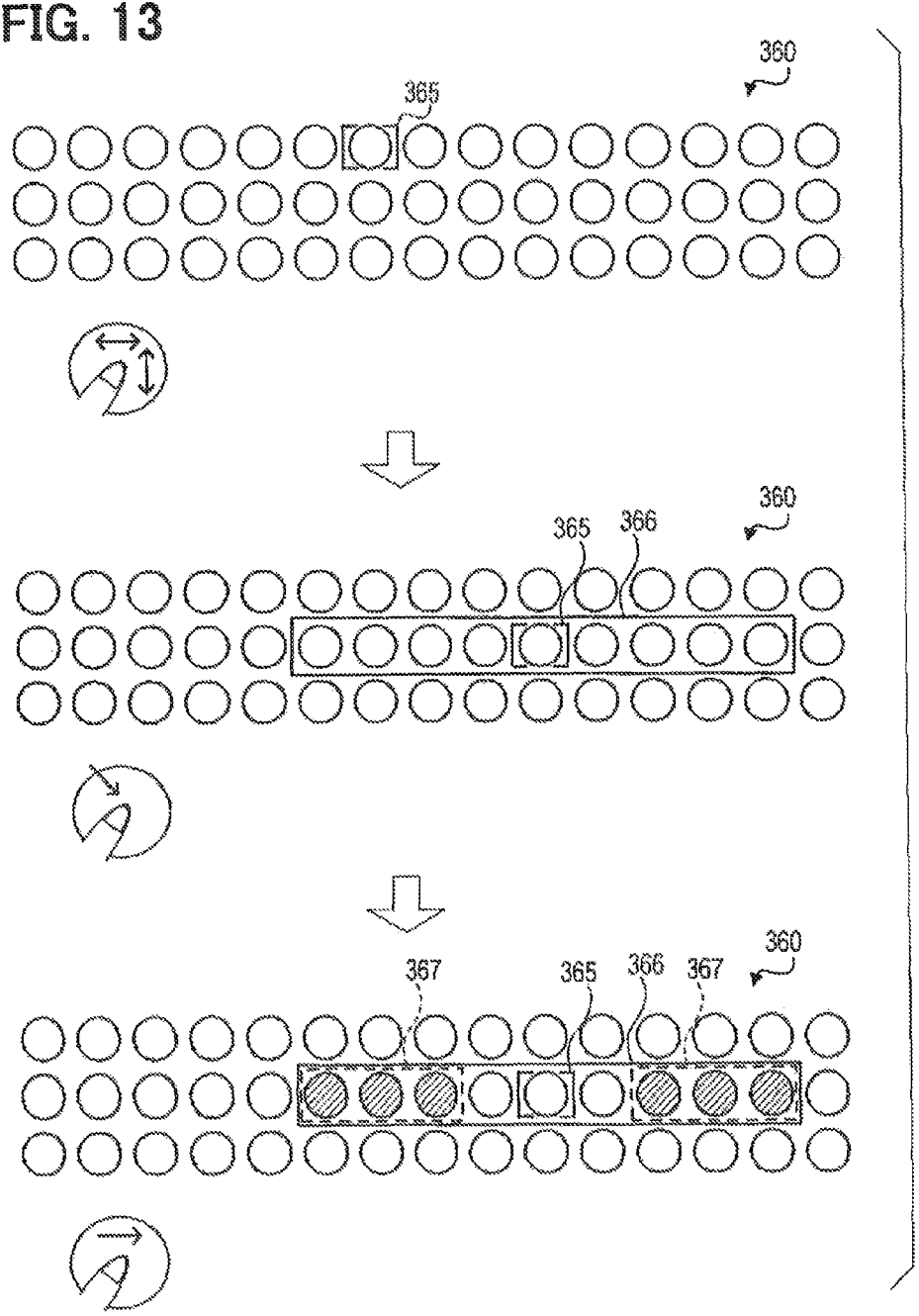
FIG. 13 is an explanatory diagram showing a screen image displayed when a correction range of the speech character string is set according to the fourth embodiment.

The control portion 13 sets the character string included in the correction region 362 to be the correction range. Here, depending on the standard position and the operation force, multiple character strings, which are not continuously arranged in the speech character string displayed on the display region 360, may be set as the correction range Alternatively, the control portion 13 may display the cursor 365 in order to select one of letters, which provide the speech character string displayed on the display region 360. Further, the portion 13 may move the cursor 365 in accordance with the operation of swiping the operation surface so that one of letters is selected (please refer to FIG. 13).

In the above case, when a certain operation force is applied to the operations surface, the control portion 13 specifies the character string having the letter selected by the cursor 365 and disposed at the center (i.e., the standard position) as the correction range. Further, the portion 13 may display the correction range 366 in the display region 360 of the speech character string. Furthermore, the control portion 13 may adjust the length of the correction range 366 in accordance with the operation force. As the operation force increases, the length of the correction range 366 increases.

In the above case, depending on the position of the cursor 365 and the operation force, the character string covering multiple lines in the speech character string displayed on the display region 360 may be specified as the correction range. Further, alternatively, the character string having the letter selected by the cursor 365 and disposed at the tail end or the top end may be specified as the correction range.

After that, when a finger is separated from the operation surface of the touch pad 20, and the swiping operation and the tapping operation of the operation surface are completed, the control portion 13 determines the correction range at that moment. However, when these operations are performed again within a predetermined time interval, the control portion 13 re-starts to adjust the correction range in accordance with the operations.

Then, at step S645, the control portion 13 determines whether the scraping operation (i.e., flicking operation) is performed on the touch pad 20, which is used for setting the correction range, with a predetermined speed or more toward a predetermine direction. When the position determination is obtained (i.e., "Yes" in step S645), the control portion 13 proceeds the process to step S650. When the negative determination is obtained (i.e., "No" in step S645), the control portion 13 proceeds the process to step S640.

The control portion 13 may terminate the present process in a case where the scraping operation is not performed even when a predetermine time has elapsed since the correction range was determined.

At step S650, the control portion 13 determine detects the misrecognition character string in the character string included in the correction range of the speech character string, similar to step S240 of the speech recognition process according to the first embodiment. Then, the process proceeds to step S655. Here, when multiple character strings are included in the correction range, the portion 13 detects the misrecognition character string in each character string.

The process in steps S655 to S670 is similar to steps S245 to S260 in the speech recognition process according to the first embodiment. Thus, the explanation of the process is skipped. At step S675, the control portion 13 generates the corrected character string by replacing the misrecognition character string with the correction character string and by deleting the deletion character string from the replaced speech character string, similar to step S265. Then, the control portion 13 displays the corrected character string in the display region 360 of the speech character string under a condition that the correction character string 363, 367 is clearly specified (in FIGS. 12 and 13). Then, the process proceeds to step S680.

The process in step S680 is similar to step S370 of the speech recognition process according to the first embodiment. Thus, the explanation of the process is skipped.

Fifth Embodiment (Explanation of construction)

Next, a speech recognition apparatus according to a fifth embodiment will be explained.

Figure 14:
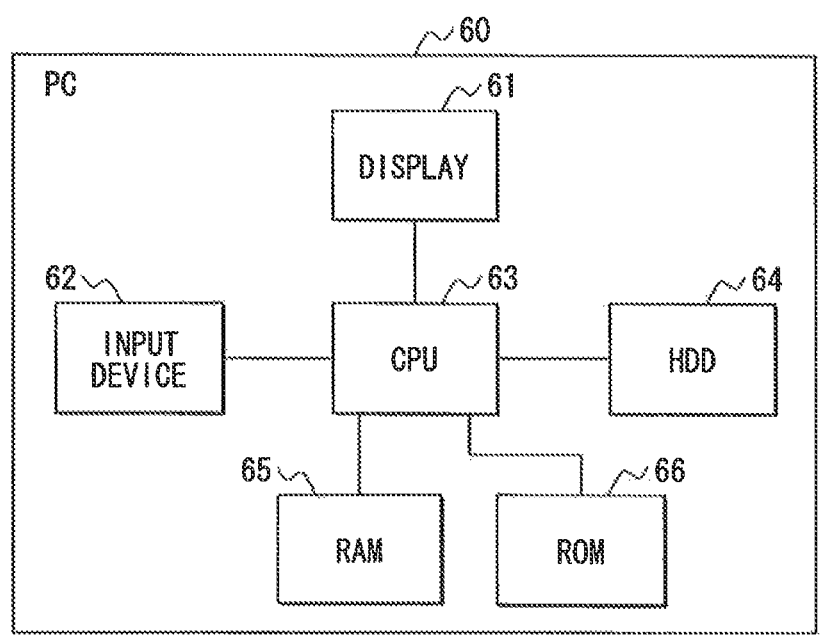
FIG. 14 is a block diagram showing a construction of a PC according to a fifth embodiment.

FIG. 14 shows a conventional personal computer (i.e., PC) 60 that functions as the speech recognition apparatus according to the fifth embodiment. The PC 60 includes a display 61 for displaying various images, and an input device 61 including a keyboard, a mouse, a touch pad, a microphone and the like.

Further, the PC 60 includes a RAM 65 as a writable volatile memory, a ROM 66 as a read-only non-volatile memory, and a HDD 64 as a writable non-volatile memory for storing various programs.

The RAM 65 is used as a memory region for storing temporarily a program when the program stored in the HDD 64 is executed and a memory region for storing temporarily working data.

The CPU 63 reads out the operating system (i.e., OS) from the HDD 64 to execute the OS. The CPU 63 executes various programs stored in the HDD 64 as the process through the OS. In the process, the CPU 63 receives the input of the signal from the input device 62 is necessary. Further, the CPU 63 outputs the image signal to the display 61. Furthermore, the CPU 63 controls the HDD 64 to read out data and to write data.

The speech recognition program 100 having the constitution similar to the first to fourth embodiments is installed in the PC 60. The CPU 63 executes the speech recognition program 100 as the process over the OS. The PC 60 corrects the speech recognition and the speech recognition result (i.e., the speech character string) through the microphone, the keyboard, the mouse, the touch pad and the like as the input device 62. Further, the PC 60 executes the operation of application software, which functions as the above process, and executes the preparation of documents in accordance with the speech recognition result after correction.

(Explanation of Operation)

Next, the operation of the speech recognition apparatus (i.e., the PC 60 for executing the speech recognition program 100) according to the fifth embodiment will be explained. In the PC 60, the speech recognition of the speech content of the user and the correction of the speech recognition result are performed according to the speech recognition process almost similar to the first to fourth embodiments. However, the input method of the correction character string and the deletion character string or the like is different.

Specifically, the speech recognition process according to the fifth embodiment is provided by replacing the control portion 13 in the speech recognition process according to the first to fourth embodiments with the CPU 63, replacing the display portion 15 with the display 61, replacing the memory portion 16 with the HDD 64, and replacing the touch pad 20 with the input device 62 (i.e., the keyboard, the mouse and the touch pad).

Further, in steps S230 and S235 in the first embodiment, and in steps S630 to S645 in the fourth embodiment, the input of the correction character string and the input of the deletion character string are received by the operation of swiping the operation surface of the touch pad 20.

On the other hand, in the fifth embodiment, the input of the correction character string or the like may be received through the touch pad, similar to the first to fourth embodiments. Alternatively, the input of the correction character string or the like may be received through the keyboard. Alternatively, the input of the correction character string or the like may be received by the operation of drawing a letter with moving the mouse. Alternatively, the input of the correction character string or the like may be received through the keyboard or the mouse.

(Effects)

In the speech recognition apparatus according to the first to fifth embodiments, when the speech recognition result (i.e., the speech character string) is wrong, the error can be corrected by the operation performed through the touch pad 20 or the like. Further, a part (i.e., the misrecognition character string), which is misrecognized, is easily and precisely corrected. Accordingly, even in a noisy environment such as a compartment of a vehicle, for example, the operation of the in-vehicle device and the PC and the preparation of the documents such as a mail are executed smoothly through the voice.

Further, in the speech recognition apparatus according to the first, fourth and fifth embodiments, the driver or the like understands the misrecognition part (i.e., the misrecognition character string) in the speech character string. The misrecognition character string is replaced with the correction character string only by inputting the proper recognition result (i.e., the correction character string) via the touch pad 20 or the like. Accordingly, the speech character string is easily corrected.

Specifically, in the speech recognition apparatus according to the first and fourth embodiments, since the correction character string is input by drawing the letter on the operation surface of the touch pad 20, which is attached to the steering wheel 30, the correction character string is input under a condition that the driver holds the steering wheel. Accordingly, even when driving the vehicle, the speech character string is easily corrected. Further, in a noisy compartment of the vehicle, it is possible to execute smoothly the operation of the in-vehicle device through the voice.

Further, in the speech recognition apparatus according to the first and fourth embodiments, all of the character strings, each of which has the same number of letters as the correction character string or the number of letters slightly different from the correction character string, are retrieved from the speech character string. Further, one of these character strings having the maximum number of letters that coincide with the correction character string is detected as the misrecognition character string. Accordingly, the misrecognition character string is detected with high accuracy.

In addition, each word class for providing the speech character string having the maximum number of letters that coincide with the correction character string may be detected as the misrecognition character string. In this case, the number of times for counting the coincident letters is reduced, compared with a case where all of the character strings having the number of letters equal to the correction character string are retrieved. Thus, the process load is reduced, and further, the misrecognition character string is detected with high accuracy.

However, when the misrecognition character string is detected by the above method (i.e., a method based on the edit distance), a possibility for misdetection of the misrecognition character string may be increased in a case where the length of the correction character string is short or a case where the length of the character string as a detection object of the misrecognition character string is long.

However, the speech recognition apparatus according to the fourth embodiment sets the correction range based on the speech character string through the touch pad 20. Further, the apparatus detects the misrecognition character string in the correction range. Accordingly, the detection object of the misrecognition character string can be narrowed, and therefore, the detection accuracy of the misrecognition character string is improved.

Further, the speech recognition apparatus according to the fourth embodiment can set the standard position for defining the correction range when the user executes a swiping operation to the operation surface of the touch pad 20. Further, the apparatus can determine the correction range by tapping the operation surface. Accordingly, the user can sets the correction range easily with one hand while watching the screen, on which the speech character string is displayed.

After the correction range is set, the speech character string is corrected by executing the scraping operation with respect to the operation surface of the touch pad 20. Accordingly, the correction range can be set and the speech character string can be corrected according to a sequence of operations under a condition that the user touches the operation surface. Thus, the correction of the speech character string is easily and precisely performed.

Further, in the speech recognition apparatus according to the first to fifth embodiments, the speech recognition result, which is converted to a Chinese character and/or a Japanese katakana character, is displayed. Further, the character string input by the driver or the like and converted to a Chinese character, a Japanese katakana character, and/or a Japanese hiragana character is used as a correction character string. Thus, the driver or the like can easily acknowledge the contents of the speech character string and the correction character string, so that usability is improved.

Further, the speech recognition apparatus according to the first and fourth embodiments receives the input of the correction character string via one of two touch pads 20, which are attached to the steering wheel 30. Further, the apparatus receives the input of the deletion character string for deleting from the speech character string via the other touch pad 20. The apparatus replaces the misrecognition character string in the speech character string with the correction character string, and deletes the deletion character string from the speech character string, so that the speech character string is corrected. Accordingly, the speech character string can be corrected by various methods, so that the usability is improved.

Further, the speech recognition apparatus according to the first, fourth and fifth embodiments store the correction character string and the misrecognition character string that is replaced with the correction character string, which are in relation with each other, as the correction record data. When the speech character string includes the misrecognition character string stored in the correction record data, the misrecognition character string is replaced with the correction character string, which is in relation with the misrecognition character string in the correction record data, so that the speech character string is corrected. Accordingly, the speech character string can be corrected without bothering the driver or the like.

Further, the misrecognition character strings may be detected multiple times. In this case, one of these misrecognition character strings, which coincides with the misrecognition character string stored in the correction record data, is specified as the misrecognition character string that is not detected by mistake. Other misrecognition character strings are withdrawn. Thus, the speech character string is corrected with high accuracy.

Further, the speech recognition apparatus according to the second and third embodiments receives the character string to be replaced with the correction character string and the operation for setting the insertion position of the correction character string via two touch pads 20, which are attached to the steering wheel 30. Thus, the speech character string is corrected in accordance with the operation. Accordingly, the driver can correct the speech character string easily.

Specifically, in the second embodiment, the left side cursor corresponding to the left side touch pad 20 and the right side cursor corresponding to the right side touch pad 20 are displayed on both sides of the speech character string, respectively. The correction range is set by moving the corresponding cursor in accordance with the operation of a respective touch pad 20. Specifically, the correction range is set by a method for moving the position of the corresponding cursor in accordance with the operation force of a respective touch pad 20, or a method for moving the corresponding cursor in accordance with the scraping operation to the respective touch pad 20.

Thus, the driver can correct the speech character string easily with holding the steering wheel, and smoothly execute the operation of the in-vehicle device and the preparation of the documents via the voice.

Other Embodiments (1) In the speech recognition apparatus according to the first to fifth embodiments, the Japanese hiragana character indicative of the speech recognition result, which is converted to a Chinese character and a Japanese katakana character, is generated as the speech character string. Further, the character string input by the driver or the like, which is converted to a Chinese character, a Japanese katakana character, and a Japanese hiragana character, is used as the correction character string. However, these conversions such as a Chinese character conversion are not necessarily performed. Alternatively, the speech character string including a Japanese hiragana character (and/or a Japanese katakana character) may be generated, and the correction of the speech character string may be performed by receiving the input of the correction character string including a Japanese hiragana character (and/or a Japanese katakana character) from the driver or the like.

In the above cases, when a comparative simple operation to the in-vehicle device or the like is performed via the voice, particular difficulty is not found. Further, the speech character string is corrected with reducing the process load.

(2) Further, the speech recognition apparatus according to the first to fourth embodiments receives the correction character string, the deletion character string, the information for correcting the speech character string, and the input of the correction range via the touch pad 20. In addition, the apparatus may receive the input of the correction character string or the like via the operation portion including multiple buttons.

Further, the speech recognition apparatus 10 according to the fourth embodiment sets the correction range in accordance with the operation force with respect to the operation surface of the touch pad 20. In addition, for example, the apparatus may set the correction range in accordance with the pinching operation with respect to the operation surface of the touch pad 20. Alternatively, the apparatus may directly designate the top end and the bottom end of the character string as the correction range by the swiping operation with respect to the operation surface of the tough pad 20.

Further, the speech recognition apparatus 10 corrects the character string in the correction range in accordance with the scraping operation after the correction range is set. In addition, for example, the apparatus may correct the character string in the correction range in accordance with the operation force equal to or larger than predetermined magnitude applied to the operation surface of the touch pad 20.

The touch pad 20 in the first to fourth embodiments and the input device 62 in the fifth embodiment correspond to an operation portion.

Further, step S205 in the speech recognition process according to the first embodiment corresponds to a recognition apparatus and a recognizing step. Step S210 correspond to a display device and a displaying step. Step S220 corresponds to a correction device. Steps S230 and S235 correspond to a reception device and a receiving step. Step S240 corresponds to a retrieving device and a retrieving step. Step S250 corresponds to a detection device. Step S265 corresponds to a correction device and a correcting step. Step S270 corresponds to a memory device.

Further, step S405 in the speech recognition process according to the second embodiment corresponds to a recognition apparatus and a recognizing step. Step S410 correspond to a display device and a displaying step. Steps S415 corresponds to a reception device and a receiving step. Step S420 corresponds to a display device, a reception device and a correction device. Step S425 corresponds to a correction device and a correcting step.

Further, step S505 in the speech recognition process according to the third embodiment corresponds to a recognition apparatus and a recognizing step. Step S510 correspond to a display device and a displaying step. Steps S525 corresponds to a reception device and a receiving step. Step S530 corresponds to a reception device, a correction device and a correcting step. Step S535 corresponds to a correction device and a correcting step.

Further, the correction range in the second and third embodiments corresponds to the deletion letter and the deletion character string.

Further, step S605 in the speech recognition process according to the fourth embodiment corresponds to a recognition apparatus and a recognizing step. Step S610 correspond to a display device and a displaying step. Steps S620 corresponds to a correction device. Step S630 corresponds to a reception device and a receiving step. Steps S635 to S645 correspond to a reception device. Step S650 corresponds to a detection device and a retrieving device. Step S660 corresponds to a detection device. Step S675 corresponds to a correction device and a correcting step. Step S680 corresponds to a memory device.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:
1. A speech recognition apparatus comprising:
a recognition device that recognizes a content of a voice made by a user and generates a speech character string as a character string indicative of a recognition result;

a display device that displays the speech character string generated by the recognition device;

a reception device that receives an input of a correction character string, which is used for correction of the speech character string displayed in the display device, through an operation portion operated by the user under a condition that a part of a body of the user contacts the operation portion;

a correction device that corrects the speech character string with using the correction character string, the input of which is received by the reception device; and a detection device that detects a misrecognition character string, which is a character string different from the content of the voice made by the user, in a predetermined correction range of the speech character string, wherein:

the correction device executes correction by replacing the misrecognition character string detected by the detection device with the correction character string, the input of which is received by the reception device, the reception device receives the input of the correction range via the operation portion, the detection device detects the misrecognition character string in the correction range of the speech character string, the operation portion includes an operation surface having a plate shape, the operation portion is attached to a steering wheel of a vehicle, and the reception device receives the input of the correction character string by detecting a letter input by a swiping operation of the operation surface of the operation portion.

2. The speech recognition apparatus according to claim 1, wherein:

the reception device receives the input of the correction range in such a manner that the reception device detects an user operation of swiping the operation surface of the operation portion as an operation for determining a standard position, which defines the correction range, and detects a magnitude of a force pushing the operation surface as an operation for determining the correction range having the standard position as a reference.

3. The speech recognition apparatus according to claim 2, wherein:

after the reception device receives the input of the correction range, the reception device receives an instruction of the correction in such a manner that the reception device further detects an operation of swiping the operation surface of the operation portion along a predetermine direction; and when the reception device receives the instruction of the correction, the correction device executes the correction.

4. The speech recognition apparatus according to claim 1, wherein:

the detection device detects a character string having a maximum number of letters that coincide with the correction character string, the input of which is received by the reception device, as the misrecognition character string in the correction range; and the correction device executes the correction by replacing the misrecognition character string detected by the detection device with the correction character string relating to detection of the misrecognition character string.

5. The speech recognition apparatus according to claim 4, further comprising:

a retrieving device that defines a letter number, which is determined by a number of letters included in the correction character string, as a correction letter number, and retrieves all of character strings having the correction letter number in the correction range, wherein:

the detection device detects one of the character strings retrieved by the retrieving device, which has a maximum number of letters that coincide with the correction character string, as the misrecognition character string.

6. The speech recognition apparatus according to claim 1, wherein:

the recognition device generates the speech recognition string, which includes a Chinese character; and the reception device converts a predetermined Japanese katakana character included in the character string into the Chinese character after the reception device receives the input of the character string used for correction, and defines a converted character string as the correction character string.

7. The speech recognition apparatus according to claim 1, wherein:

the operation portion includes at least two operation elements, which are attached to the steering wheel;

the reception device receives an input of the correction character string via one operation element, and receives an input of a deletion character string, which is to be deleted from the speech character string, by detecting a letter input by a swiping operation of an operation surface of the other operation element; and the correction device corrects the speech character string by deleting the deletion character string, the input of which is received by the reception device, from the speech character string.

8. The speech recognition apparatus according to claim 1, further comprising:

a memory device that stores the misrecognition character string relating to the correction executed by the correction device and the correction character string, with which the misrecognition character string is replaced, as a correction record, wherein:

the correction device executes the correction by replacing the misrecognition character string with the correction character string stored as replacement of the misrecognition character string in the correction record when the speech character string includes the misrecognition character string stored as the correction record.

9. The speech recognition apparatus according to claim 5, wherein:

the detection device detects one of the character strings in the correction range having a maximum number of letters that coincide with the correction character string, the input of which is received by the reception device, as the misrecognition character string; and the correction device executes the correction by replacing the misrecognition character string detected by the detection device with the correction character string relating to detection of the misrecognition character string;

the apparatus further comprising:

a memory device that stores the misrecognition character string relating to the correction executed by the correction device and the correction character string, with which the misrecognition character string is replaced, as a correction record, wherein:

when the detection device detects a plurality of character strings in the speech character string as the misrecognition character string with respect to one correction character string, the detection device specifies a proper misrecognition character strings among a plurality of detected character strings based on the misrecognition character string relating to the correction record.

10. A speech recognition apparatus comprising:
a recognition device that recognizes a content of a voice made by a user and generates a speech character string as a character string indicative of a recognition result;
a display device that displays the speech character string generated by the recognition device;
a reception device that receives an input of a correction character string, which is used for correction of the speech character string displayed in the display device, through an operation portion operated by the user under a condition that a part of a body of the user contacts the operation portion; and
a correction device that corrects the speech character string with using the correction character string, the input of which is received by the reception device, wherein:
the speech recognition apparatus is mounted on a vehicle,
the operation portion includes an operation surface having a plate shape and is attached to a steering wheel of the vehicle,
the reception device receives the input of the correction character string by detecting a letter input by a swiping operation to the operation surface of the operation portion, and receives an input of correction information for specifying an insertion position of the correction character string in the speech character string and for specifying a deletion letter to be deleted from the speech character string via the operation surface, and
the correction device executes the correction by inserting the correction character string at the insertion position of the speech character string, which is specified by the correction information, and by deleting the deletion letter from the speech character string when the correction information specifies the deletion letter.

11. The speech recognition apparatus according to claim 10, wherein:
the operation portion includes at least two operation elements, which are attached to the steering wheel;
the reception device receives an input of the correction information for specifying one end of the deletion character string including a plurality of deletion letters via one operation element, and receives an input of the correction information for specifying the other end of the deletion character string via the other operation element; and
the display device displays a cursor indicative of the one end of the deletion character string and another cursor indicative of the other end of the deletion character string over the speech character string, the one end and the other end being specified by the correction information.

12. The speech recognition apparatus according to claim 11, wherein:
the reception device receives the input of the correction information by detecting a magnitude of a force pushing the operation surface of the one operation element as an operation for specifying the one end of the deletion character string, and receives the input of the correction information by detecting a magnitude of a force pushing the operation surface of the other operation element as an operation for specifying the other end of the deletion character string.

13. The speech recognition apparatus according to claim 11, wherein:
the reception device receives the input of the correction information by detecting a swiping operation to the operation surface of the one operation element as an operation for specifying the one end of the deletion character string, and receives the input of the correction information by detecting a swiping operation to the operation surface of the other operation element as an operation for specifying the other end of the deletion character string.

* * * * *